United States Patent

[11] 3,630,015

| [72] | Inventor | Kurt Lehovec<br>11 Woodlawn Drive, Williamstown, Mass. 01267 |
|---|---|---|
| [21] | Appl. No. | 4,358 |
| [22] | Filed | Jan. 20, 1970 |
| [45] | Patented | Dec. 28, 1971<br>Continuation-in-part of application Ser. No. 824,624, May 14, 1969, now abandoned. This application Jan. 20, 1970, Ser. No. 4,358 |

[54] LIGHT TRANSFORMATION DEVICE
18 Claims, 5 Drawing Figs.

[52] U.S. Cl. ................................................... 58/50, 250/212
[51] Int. Cl. ............................................... G04b 19/30
[50] Field of Search ........................................ 58/23, 50; 340/3, 34, 335, 166 EL, 324; 350/150; 250/200, 212

[56] References Cited
UNITED STATES PATENTS

| 3,166,742 | 1/1965 | Sherwin............... | 58/50 |
| 3,245,315 | 4/1966 | Marks et al. ........ | 350/150 |
| 3,392,064 | 1/1966 | Watters............... | 318/127 |
| 3,427,797 | 2/1969 | Kimura et al. ..... | 58/23 |
| 3,505,804 | 4/1970 | Hofstein............. | 58/50 |
| 3,198,945 | 8/1965 | Dewes et al......... | 250/212 |

Primary Examiner—Richard B. Wilkinson
Assistant Examiner—Edith C. Simmons

ABSTRACT: Incident light is transformed into electricity, which generates, or else modulates, outgoing light providing an optical contrast, and resulting in a self-powered display unit. The contrast is enhanced by modulation of the outgoing light intensity.

3,630,015

LIGHT TRANSFORMATION DEVICE

CROSS-REFERENCE TO RELATED APPLICATION

This application is a continuation-in-part of now abandoned U.S. Application Ser. No. 824,623 filed May 14, 1969.

BACKGROUND OF THE INVENTION

The invention concerns a device for transforming ambient light into light of different color and/or intensity to generate a self-powered visual display. In particular, the invention concerns a time-variable display device powered by the ambient light level.

Display units encompass a wide variety of devices including wristwatches and outdoor advertising signs.

Presently used watch dial indicators utilize mechanically moving parts. With the trend toward electrically powered watches, a need has arisen for an electro-optical indicator such as a set of light emitters arranged on a watch dial and activated in sequence of position and time corresponding to the hours and minutes to be indicated.

Electroluminescent light sources require electrical power which is an unduly large drain on the battery of a battery-powered watch. Therefore, it is one object of this invention to describe a self-powered electro-optical display.

It is another object of this invention to describe a self-powered electro-optical display utilizing light pulses thereby improving contrast and saving power.

Nighttime advertising signs, such as neon lights, attract attention frequently by intermittent operation. I am not aware of intermittent operation of daytime advertising signs in the open country removed from power lines.

It is another object of my invention to provide self-powered intermittent operation for daytime advertising signs.

These and other objects will be described in what follows.

SUMMARY OF THE INVENTION

Briefly, the invention comprises a set of photovoltaic elements as electrical power source for an electro-optical display unit. The area of the photovoltaic elements and the number of them placed in series is selected to obtain the appropriate current and voltage for the electro-optical display units.

The electro-optical display units may be either be of the electroluminescent type, such as a PN-junction light emitter, or else it may be of the light-modulator type, such as a liquid crystal display cell.

The photovoltaic cells charge a capacitor, which is periodically discharged through the electro-optical display unit to generate light pulses thereby improving visual detection and conserving electric power. Clock circuitry is provided to activate in sequence a set of electroluminescent indicators on a watch dial by application of the photovoltaic power.

In the case of an outdoor advertising sign, feedback of the outgoing light to the voltage applied at the electro-optical display cell can be established by means of a photocell circuit, thereby causing oscillatory modulation of the outgoing light intensity.

PREFERRED EMBODIMENTS

Figure 1:
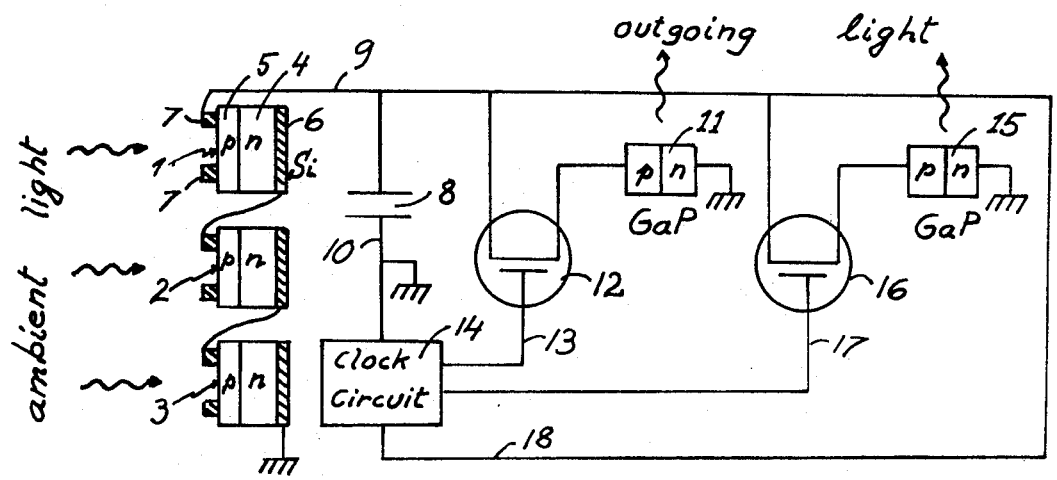
FIG. 1 shows a set of photovoltaic cells which charge a capacitor in circuit connection with an electric switch and an electroluminescent indicator according to this invention.

Referring to FIG. 1, there are shown three PN-junction photovoltaic elements, so-called solar batteries, 1, 2, 3 in series connection and exposed to ambient light. Each photovoltaic element consists of an N-type S body 4, having an indiffused P-region 5 at one surface with contact 6 to the N-body, and a contact ring 7 to the P-region. In general, there will be many more than three photovoltaic elements in series; only three are shown to simplify the drawing. The photovoltaic elements charge capacitor 8 through leads 9 and 10. In parallel to the capacitor lies a circuit containing the GaP PN-junction light emitter 11 and the MOS-FET gate 12. The gate is normally in the off position unless it is activated through line 13 from a clock circuit 14.

Another such circuit contains the light emitter 15 and the gate 16 activated through line 17 from the clock circuit 14. The clock circuit can be powered from a battery, or else can be powered by the photovoltaic cells through the line 18 as shown in FIG. 1.

Figure 2:
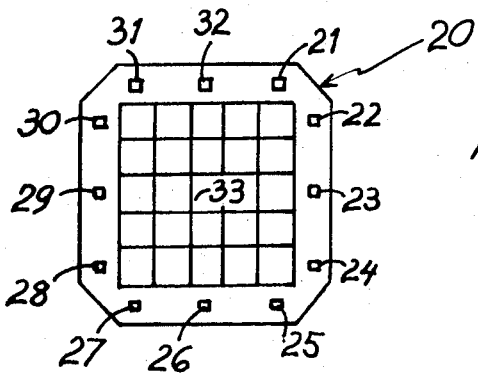
FIG. 2 shows a top view of a watch dial layout according to this invention with photovoltaic cells and a set of electroluminescent indicators.

Referring now to FIG. 2, there is shown the dial 20 of a watch having the customary "hour spots" 21 to 32 which represent light-emitting electroluminescent elements such as 11 of FIG. 1. There is shown also a checkerboard 33 of 5×5 fields, each representing a photovoltaic cell of the type indicated by 1 to 3 in FIG. 1. These cells are connected in series and charge a capacitor (not shown) which is located under the face of the watch. From this capacitor there are 12 circuit connections (not shown) extending to the 12 indicator dots 21 and 32. Each connection line contains an electronic switch triggered by the electric watch at the appropriate time.

In order to increase contrast between incident light level and emitted light, it is advisable to place the light emitters in positions protected against ambient light while placing the photovoltaic elements in positions of maximum exposure to the ambient light. This leads to a radically different watch design, a preferred example of which is shown in FIG. 0.

Figure 3:
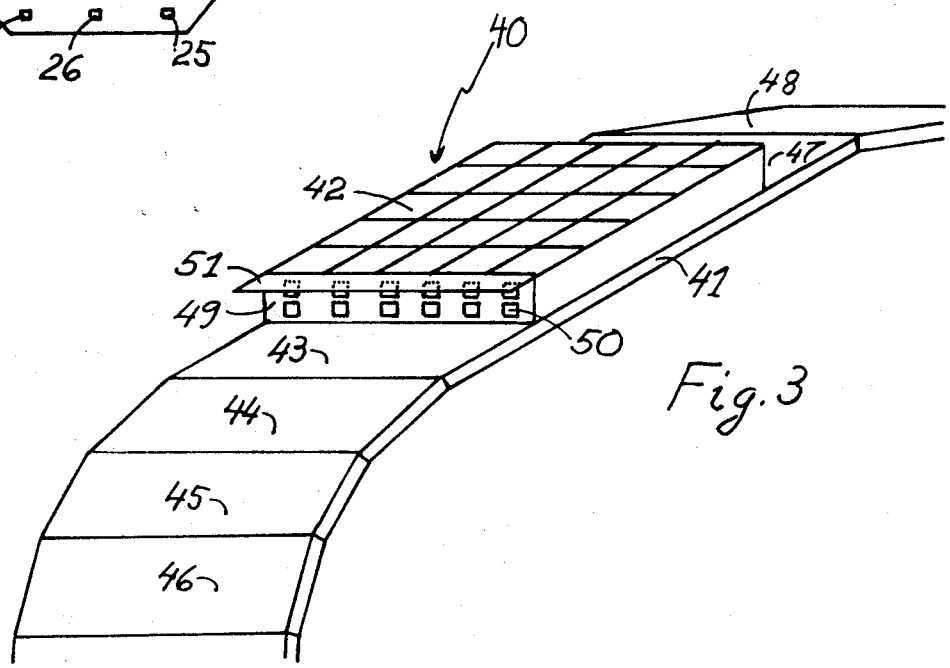
FIG. 3 shows a view of an improved layout of a watch according to this invention.

In FIG. 3 there is shown a rectangular watch 40 on wrist band 41. The exposed major face 42 of the watch carries the photovoltaic elements, indicated by a checkerboard pattern of 5×5 fields, each field representing one photovoltaic cell. Additional photovoltaic cells can be arranged on the surface of the watch band as indicated by the stripes 43–48, etc.

The light-emitting elements are placed on the narrow side face 49 of the watch. Twelve light-emitting elements extending in two rows of six each are shown and one element has been marked by 50. An extension 51 of the upper face 42 shields the face 49 against ambient light. The light dots which indicate time can be arranged in numeric display pattern to print out time directly, e.g., 5:23.

The area of each photovoltaic element and the number of such elements placed in series must be chosen in such a manner as to supply the required current and voltage to the electro-optical display unit.

Consider a photovoltaic cell of an efficiency $\eta_1$ electron/light quantum for transforming incoming light quanta into electrons. The electrons are reconverted into light quanta in the semiconducting light emitter, having an efficiency $\eta_2$ quanta/electron. Thus, the overall efficiency emitted light quantum/incident light quantum is the product $\eta_1\eta_2$. Presently obtainable values are $\eta_1 \approx 0.2$ and $\eta_2 \approx 0.01$ so that $\eta_1\eta_2 = 0.002$. If we wish to have an emitted light intensity per unit area equal to the incident one at stationary operation, the area of each photovoltaic cell must be 500 times the area of the light emitter.

The required area per photocell for a given light emitter area can be diminished by operating the light emitter on an intermittent basis. If the fraction of time a light emitter is operating is $f=0.1$, then peak light intensity per emitter area equal to ambient light intensity can be obtained from an emitter area which is the fraction $\eta_1\eta_2/f = 10\eta_1\eta_2$ of photocell area, rather than the fraction $\eta_1\eta_2$ for continuous operation of the light emitter. Or else, if the emitter area were kept at $\eta_1\eta_2$ of the photovoltaic cell area, the emitted peak intensity per unit area would be $1/f=10$ times the ambient light intensity.

Another design consideration is the voltage required by the light emitter to obtain suitable light emission. Typically this voltage is about 2 volts for a PN-junction light emitter in the visible range. On the other hand, at ordinary indoor ambient light levels, the voltage generated by a photovoltaic cell is only in the 100 mv. range. Thus, a large number of photovoltaic cells, about 25, must be connected in series to provide the driving voltage for the light emitter, unless the low voltage level of the photovoltaic cell is transferred electronically in a high voltage level by a circuit comprising an oscillator and transformer.

Three means, either singly, or, preferably, in combination can be employed in order to increase the contrast between the ambient and the emitted light. First, we can choose a light emitter of distinct color, e.g., green or red for GaP. Secondly, we can operate the light emitter intermittently. Third, for a given current supplied to the light emitter from the storage capacitor we can restrict the emitter area to obtain a larger brightness, albeit from a smaller area.

It is a very favorable feature of the present invention that the voltage and current output of a photovoltaic cell increase with the ambient light level to which it is exposed, and that the brightness of the electroluminescent indicator powered by said photovoltaic cells increases accordingly, so that the contrast ratio remains approximately the same over a wide range of ambient light levels. Quantitatively this relationship results from the fact that open circuit photovoltage at higher light levels increases with the logarithm of the incident light intensity, and that the forward current through a PN-junction, and, therefore, the emitted light intensity increases exponentially with the applied voltage, the exponential of a logarithmic function providing the proportionality.

An example for a self-powered electro-optical indicator for a watch dial of 4 cm. diameter according to this invention is as follows: Twenty-five silicon solar batteries, each of 0.5 cm.$^2$, are connected in series to a solid electrolyte tantalum capacitor of 10 uf. and 10-volt rating. A set of 12 MOS-FET switches is provided for discharging the capacitor through a set of 12 gallium phosphide PN-junction light emitters, emitting in the visible range, each emitter having an area of 0.1 mm.$^2$. The set of MOS-FET's is activated in sequence by clock circuits. Time can be indicated (i) by the location of the activated light emitter and (ii) by the frequency of activation; e.g., hours can be indicated by activating the appropriate "hour spot" in the dial at regular intervals, e.g., once every second or so, for a brief duration, e.g. 0.1 second. The same 12 light-emitting spots can be used for indicating the minutes by a sequence code; e.g., 23 minutes is two flashes of the 4-hour dot followed by three flashes of the 5-hour dot, followed by two flashes of the 4-hour dot, e.g., 24 minutes is one flash by the 4-hour dot followed by four flashes of the 5-hour dot, etc. These "minute" flashes can be placed in the intervals between the "hour" flashes and distinguished by intensity or duration.

The electrical timer circuit (clock circuit) governs the selection of light emitter which is operative. The frequency of light emission for a so-selected light emitter is governed by the ambient light level, by means to be explained later on hand of FIGS. 4 and 5. At low ambient light levels, light emission flashed are spaced at larger intermission periods to conserve energy.

Figure 4:
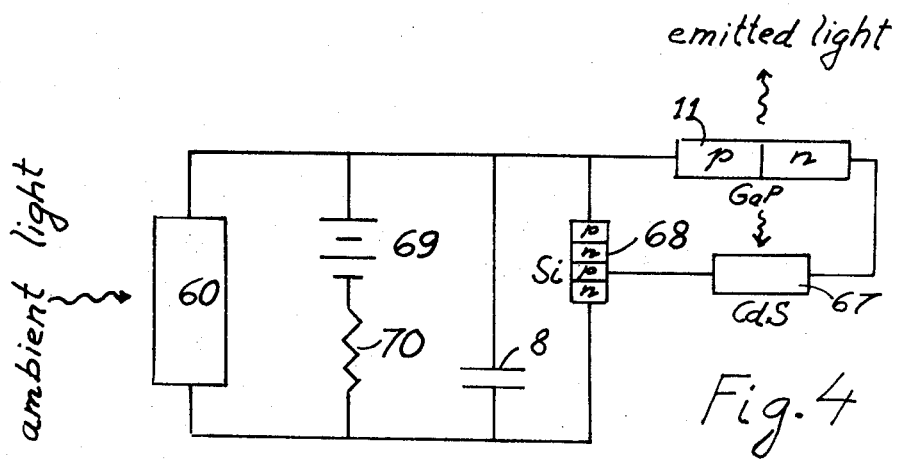
FIG. 4 shows an arrangement for generating a time-variable electro-optical display according to my invention.

FIG. 4 shows a circuit for generating light flashes from the light emitter 11. The photovoltaic generator 60 comprising several photovoltaic cells in series and charges the capacitor 8. The voltage across 8 is applied to 11 over the photoconductor 67. The current through 67 regulates the current through the silicon controlled rectifier 68 which shunts the capacitor 8. The photoconductor 67 is responsive to light emitted from 11, but is shielded against ambient light. The light emitter 11 may consist of GaP emitting green light and 67 may consist of a CdS photoconductor.

The chemical battery 69 is an auxiliary power supply, which charges 8 through the large resistance 70 in the case of lack of ambient light.

Figure 5:
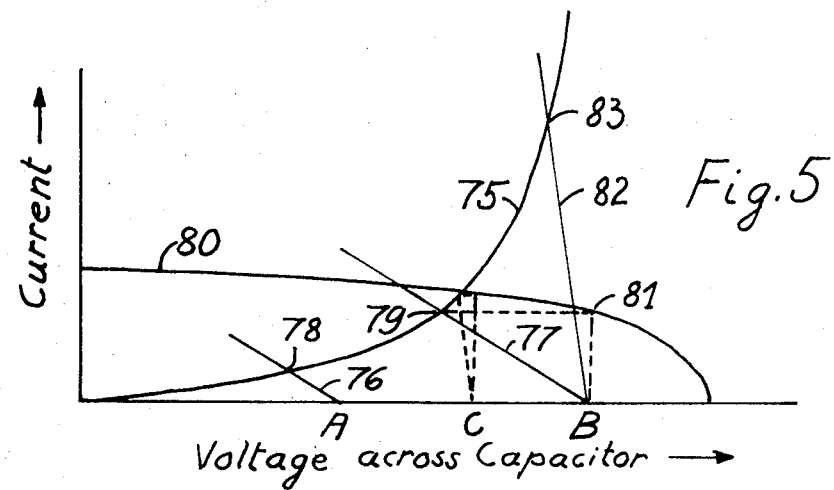
FIG. 5 explains the operation of the arrangement of FIG. 4 on hand of a current vs. voltage diagram.

The circuit of FIG. 4 operates as follows: Let us start with zero voltage across capacitor 8, and SCR 68 in the off state. The voltage across 8 builds up as a result of being charged by 60. Initially, the current through 11 is small due to the low voltage of 8, and to the high resistance of the unilluminated 67. The current through 11 can be derived from a current-voltage diagram as shown in FIG. 5.

Abscissa is the voltage across the capacitor 8 and ordinate is current. The curve 75 represents the current-voltage characteristics of the light emitter 11. The lines 76 and 77 are load lines for the unilluminated photoresistor 67 pertaining to the capacitor voltages marked A and B. Ignoring for the moment the current flow through 68, and the fact that the resistance of the photoconductor 67 may be decreased by illumination from 11, we obtain the current through 11 from the intersection points 78 and 79 of 75 with the respective load lines 76 and 77. Numeral 80 indicates the current-voltage relationship of the photovoltaic generator 60. The current pertaining to 78 is much smaller than that pertaining to 80 at the voltage A, so that the capacitor 8 is being charged and its voltage shifts toward B. Moreover, the current pertaining to 78 is too small to stimulate appreciable light emission and the resistance of the photoconductor 67 remains essentially that for zero illumination. A stationary state could be reached at the capacitor voltage B, since current of 79 equals current of 80 at the voltage B, i.e., of point 81. However, at 79 the current through 11 generates already sufficient light that the resistance of 67 is decreased, i.e., the slope of the load line becomes steeper, increasing the current through 11 further, etc. At the load line 82, of the illuminated photoconductor 67, the current of the intersection point 83 drawn from the capacitor 8 exceeds greatly the charging current to 8 from 60 and the voltage across the capacitor collapses, i.e., it shifts from B to smaller values. The current through 11 thus diminishes. However, the photoconductor has a finite time response to change of light intensity so that its load line maintains temporarily the steepness of 82 even if illumination has ceased. A stationary state would be reached at about voltage C. However, the capacitor voltage decreases further because of the current through 68 which shunts 8. This current is switched on at about point B when the load resistance has diminished from 77 to 82 and the current through 11 and 67 has increased accordingly. The capacitor now discharges through the turned-on SCR 68 until its voltage is so small that the current through 11 and 67 is insufficient to maintain 68 in the conducting state. The voltage across 8 now increases being charged from 60 and the cycle repeats.

The durations of the various positions of the cycle are mainly determined by the following quantities: Shift from A to B: RC time constant of charging capacitor 8 multiplied by the internal resistance of 60, or by 70 in case of absence of ambient light. Shift from 77 to 82 arises at a speed determined by the response time of photoconductor. The simultaneously occurring decrease of capacitor voltage from B to A, is governed by the RC time constants of the capacitor C and the resistances of illuminated 67, turned on 68 and 11. Before cycle is completed, there is a delay time due to recovery of 67 after its illumination ceases. At preferred operation, the charging cycle from A to B is dominant. The resistance of the photovoltaic generator 60 increases with decreasing ambient illumination and the frequency of the cycle diminishes accordingly. Thus, at low ambient light levels, we have widely spaced flashes conserving energy, while at high ambient intensities, we have frequent flashes, and even quasi-continuous light emission. When the internal resistance of 60 exceeds 70, the chemical power source 69 takes over in supplying the major portion of electrical energy to 8.

Another preferred embodiment of my invention combines the photovoltaic power source with a light-modulating device rather than a light-emitting device. Examples for light-modulating devices are liquid crystal displays as for instance described by G. H. Heilmeier, L. A. Zanoni, and L. A. Barton in "Dynamic Scattering: A New Electro-Optic Effect in Certain Classes of Nematic Liquid Crystals," Proc. IEEE, pp. 1,162–1,171, July 1968, and the electro-optical modulations mentioned in my pending application Ser. No. 824,623. In such a case, both the photovoltaic cells and the light-modulating cells must be placed in positions of maximum exposure to the ambient light.

Light modulations can be of the reflecting type, i.e., using a reflecting backing, or else of the transmittant type. Light modulators can be employed whose absorption changes directly when a field is applied or else they may be employed in conjunction with a polarizer and analyzer, the applied voltage rotating the direction of polarization of the light in the electro-optically active material. In the case of a reflecting backing, polarizer and analyzer can be the same plate.

In the case that the ambient illumination arises from the headlights of a car, a reflecting backing is obviously preferable.

In order to increase contrast against ambient light and to attract attention, a time modulation of the light output of the display is preferred. This time modulation arises by changing the voltage applied at the electro-optical display device. The change in voltage can be achieved entirely electronically by such means as a flip-flop circuit. However, it is achieved preferably by an optical feedback of light output, involving a photoconductor.

Figure 6:
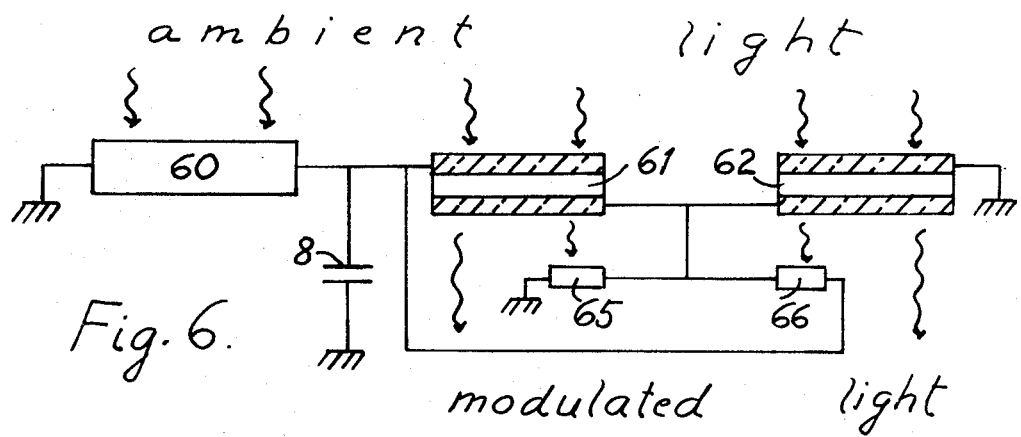
FIG. 6 shows an arrangement for generating a time-variable electro-optical display according to my invention as might be used for self-powered outdoor advertisement in daylight.

Referring to FIG. 6, there is shown the photovoltaic power generator 60, which consists of a series combination of photovoltaic cells as indicated in FIG. 1, and which charges the capacitor 8. The voltage across the capacitor is applied at two light modulators, 61 and 62, in a series combination and at the voltage divider consisting of the two photoconductors 65 and 66. The light modulators are exposed to ambient light and the light transmitted through them depends on the voltage applied at them. The transmitted light beams 63 and 64 are incident on the photoconductors 65 and 66, and decrease their resistances in accordance with the incident light level. Photoconductor 65 shunts light modulator 62, and photoconductor 66 shunts 61.

Consider the light transmitted through 61 and 62 to increase with applied voltages. Start with equal voltages applied to 61 and 62, causing equal illumination of 65 and 66. A small voltage increase on 61 increases the light transmittancy and decreases thereby the resistance of 65. The voltage across this resistance is decreased accordingly, since 65 and 66 are a voltage divider. Conversely, the voltage across 66 is increased. Since 66 shunts 61, the transmittance of 61 is further increased, causing the resistance of 65 to decrease further, etc. Eventually, device 61 is fully turned on, and device 62 fully turned off. To reverse the cycle, it is beneficial to utilize photoconductors 65 and 66 showing fatigue effects, i.e., photoconductance decreases with time at a constant light level. As the resistance of 65 increases due to fatigue, 61 obtains less voltage decreasing its transmittance, and, therefore, the light incident on 65. Its resistance increases accordingly, etc. The result is an oscillation of light transmittance between 61 and 62. The frequency of this oscillation may depend on several factors, including response times of transmittance of 61 and 62 to the application of a voltage, response time of the resistances 65 and 66 to a change in incident light and the RC time constant of the capacitor 8 and the resistors 65 and 66.

As there are many variations of the preferred embodiments which fall within the concept of my invention, it is to be understood that said invention should encompass all structures characterized by the following claims.

I claim:

1. A self-powered device for transformation of incident ambient first kind of light into an emitted second kind of light, said device comprising a photovoltaic power source for conversion of said first kind of light into electric energy, means to channel said energy into a semiconducting light emitter, said light emitter converting said channeled electric energy into said second kind of light, said second kind of light thereby deriving its energy entirely from said first kind of light.

2. The device of claim 1 whereby said second kind of light differs from said first kind of light in color.

3. The device of claim 1 whereby said semiconducting light emitter is a light-emitting PN-junction diode.

4. The device of claim 1, including means for electrical modulation of the intensity of said second kind of light.

5. The device of claim 4 whereby said means for electrical modulation is also powered by said photovoltaic power source.

6. The device of claim 4 whereby said means for modulation includes an electro-optical feedback circuit comprising a photocell exposed and responsive to said second kind of light.

7. The device of claim 4 whereby said modulated intensity comprises a sequence of light pulses.

8. The device of claim 7 whereby the duration of said light pulses is short compared to the time period between said light pulses.

9. The device of claim 8 whereby said electric energy generated by said photovoltaic power source during said period between said light pulses is stored in a capacitor, and released from said capacitor to said light emitter by an electrical triggering means to generate said light pulses.

10. The device of claim 9 whereby said electrical triggering means is activated when said storage capacitor has reached a preselected voltage, so that said time interval between light pulses increases with decreasing intensity of said first kind of light, thereby maintaining the intensity of said emitted light pulses substantially independent of the intensity of said first kind of light.

11. The device of claim 9, comprising a plurality of said channels with electric triggering means and a plurality of said semiconducting light emitters, each said light emitter connecting by a different one of said channels to said storage capacitor, said triggering means in said channels activated in sequence by a clock circuit to generate a pattern of light flashes from said light emitters.

12. The device of claim 1 whereby said photovoltaic power source consists of a plurality of photovoltaic cells in series connection generating a voltage which is a logarithmic function of said ambient light intensity, said voltage applied at said semiconducting light emitter, said light emitter being a light emitting diode biased by said applied voltage in the forward direction, thereby depending exponentially on said applied voltage, whereby the ratio between light intensity incident on said photovoltaic cells and light intensity emitted from said light emitting diode is substantially independent of said incident light energy.

13. An optical display indicator for a timepiece, said indicator having display elements arranged in the regular hour, positions of a watch dial, the hour indicated by a visual signal from the appropriately located display element and the minute indicated by a code of light pulses from at least one of said hour display elements, said at least one display element located near the appropriate minute position on the regular watch dial.

14. An electric wristwatch having a self-powered optical indicator comprising several photovoltaic cells activated by the ambient light level and connected in series to provide the power for a set of optical display elements, said display elements activated in a pattern responsive to a clock circuit, said pattern indicative of time, in combination with a watchband carrying at least some of said photovoltaic cells.

15. An electric wristwatch having a self-powered optical indicator comprising several photovoltaic cells activated by the ambient light level and connected in series to provide the power for a set of optical display elements, said display elements activated in a pattern responsive to a clock circuit, said pattern indicative of time, whereby said pattern is arranged on a side face of said wristwatch along a position of the rim of the watch and said photovoltaic elements are positioned on a major plane of said wristwatch exposed to said ambient light.

16. A visual display, providing a periodic variation of light intensity, said periodic variation arising from a liquid crystal cell, whose optical transmission or reflection of ambient light is electrically modulated, said electric modulation deriving its energy solely from a photovoltaic power source exposed to said ambient light, thereby constituting a self-powered visual display which is not dependent on electric power lines or exhaustible chemical or atomic power sources.

17. The display of claim 16, whereby said electrical modulation includes an electro-optical feedback circuit comprising a photocell exposed and responsive to said periodically varying transmitted or reflected ambient light.

18. An optical display device, which is substantially energized by the ambient light level through a photovoltaic power source above a predetermined energy value supplied by said photovoltaic power source, and substantially energized by a nonphotoelectric power source below said predetermined energy value.

* * * * *